(12) United States Patent
Guest

(10) Patent No.: US 7,425,022 B2
(45) Date of Patent: Sep. 16, 2008

(54) TUBE COUPLINGS

(75) Inventor: John Derek Guest, Bray (GB)

(73) Assignee: John Guest International Limited, Middlesex (GB)

( * ) Notice: Subject to any disclaimer, the term of this patent is extended or adjusted under 35 U.S.C. 154(b) by 336 days.

(21) Appl. No.: 11/346,113

(22) Filed: Feb. 2, 2006

(65) Prior Publication Data
US 2006/0202478 A1 Sep. 14, 2006

(30) Foreign Application Priority Data
Mar. 9, 2005 (GB) .................. 0504899.6

(51) Int. Cl.
*F16L 21/06* (2006.01)
(52) U.S. Cl. ........................ 285/322; 285/92
(58) Field of Classification Search ................ 285/322, 285/323, 309, 314, 81, 92
See application file for complete search history.

(56) References Cited

U.S. PATENT DOCUMENTS

| | | |
|---|---|---|
| 2,452,277 A | 10/1948 | Woodling |
| 2,475,741 A | 7/1949 | Goeller |
| 2,640,716 A | 6/1953 | Bigelow |
| 2,728,895 A | 12/1955 | Quackenbushetal |
| 2,953,398 A | 9/1960 | Haugen et al. |
| 3,107,108 A | 10/1963 | Greene |
| 3,180,664 A | 4/1965 | Franck |
| 3,233,924 A | 2/1966 | Stanley et al. |
| 3,250,550 A | 5/1966 | Lyon |
| 3,334,661 A | 8/1967 | Milette |
| 3,380,765 A | 4/1968 | Himmel |
| 3,434,744 A | 3/1969 | Paterson et al. |
| 3,454,290 A | 7/1969 | Tairraz |
| 3,552,781 A | 1/1971 | Helland |
| 3,679,241 A | 7/1972 | Hoffmann |
| 3,747,964 A | 7/1973 | Nilsen, Jr. |
| 3,834,742 A | 9/1974 | McPhillips |
| 3,909,046 A | 9/1975 | Legris |
| 3,989,283 A | 11/1976 | Pepper |
| 4,005,883 A | 2/1977 | Guest |
| 4,025,093 A | 5/1977 | Leczycki |
| 4,062,572 A | 12/1977 | Davis |
| 4,136,897 A | 1/1979 | Haluch |

(Continued)

FOREIGN PATENT DOCUMENTS

DE 4002057 A1 * 2/1991

(Continued)

*Primary Examiner*—David E Bochna
(74) *Attorney, Agent, or Firm*—Workman Nydegger

(57) ABSTRACT

A tube coupling comprises a coupling body having an open ended throughway, an annular shoulder in the throughway, an 'O' ring seal located against the annular shoulder and a collet located in the open end of the throughway. The collet has a head projecting out of the throughway and resilient arms extending into the throughway to engage a tapered cam surface adjacent the open end. A ring is disposed in the throughway between the collet and 'O' ring seal. The side of the ring adjacent the collet has a ramp around its inner periphery to engage the ends of the collet arms when the collet is depressed into the throughway and the other side of the ring has a ramp around its inner periphery to engage and hold the 'O' ring seal in alignment in the throughway when the collet is depressed into the throughway.

12 Claims, 5 Drawing Sheets

U.S. PATENT DOCUMENTS

| | | |
|---|---|---|
| 4,188,051 A | 2/1980 | Burge |
| 4,253,686 A | 3/1981 | Aitken et al. |
| 4,298,222 A | 11/1981 | Davies |
| 4,305,606 A | 12/1981 | Legris |
| 4,309,050 A | 1/1982 | Legris |
| 4,335,908 A | 6/1982 | Burge |
| 4,613,158 A | 9/1986 | Ekman |
| 4,637,636 A | 1/1987 | Guest |
| 4,655,159 A | 4/1987 | McMills |
| 4,867,489 A | 9/1989 | Patel |
| 4,993,755 A | 2/1991 | Johnston |
| 5,056,829 A | 10/1991 | Kramer |
| 5,121,949 A | 6/1992 | Reese |
| 5,150,924 A | 9/1992 | Yokomatsu et al. |
| 5,181,751 A | 1/1993 | Kitamura |
| 5,217,261 A | 6/1993 | DeWitt et al. |
| 5,362,110 A | 11/1994 | Bynum |
| 5,370,423 A * | 12/1994 | Guest .................... 285/322 |
| 5,388,866 A | 2/1995 | Schlosser |
| 5,466,019 A | 11/1995 | Komolrochanapron |
| 5,498,043 A | 3/1996 | Goldenberg |
| 5,593,186 A | 1/1997 | Harris |
| 5,607,190 A | 3/1997 | Exandier et al. |
| 5,758,905 A * | 6/1998 | Hama et al. .............. 285/322 |
| 5,957,509 A | 9/1999 | Komolrochanapron |
| 6,056,326 A | 5/2000 | Guest |
| 6,095,572 A | 8/2000 | Ford et al. |
| 6,193,239 B1 | 2/2001 | Fukano et al. |
| 6,293,595 B1 | 9/2001 | Marc et al. |
| 6,880,865 B2 * | 4/2005 | Guest .................... 285/322 |
| 7,032,932 B2 * | 4/2006 | Guest .................... 285/322 |
| 2002/0109353 A1 | 8/2002 | Guest |
| 2002/0135184 A1 | 9/2002 | Snyder, Sr. et al. |
| 2003/0006610 A1 | 1/2003 | Werth |
| 2003/0085568 A1 | 5/2003 | Guest |
| 2004/0032125 A1 | 2/2004 | Rehder et al. |

FOREIGN PATENT DOCUMENTS

| | | |
|---|---|---|
| EP | 0 384 516 B1 | 8/1900 |
| EP | 0 301 916 A2 | 2/1989 |
| EP | 565820 A1 * | 10/1993 |
| EP | 0 694 724 B1 | 1/1996 |
| EP | 0 939 267 B1 | 9/1999 |
| EP | 0 945 662 A2 | 9/1999 |
| EP | 1 087 168 A1 | 3/2001 |
| EP | 1 233 225 A1 | 8/2002 |
| EP | 1 310 720 A2 | 5/2003 |
| EP | 1 359 362 A1 | 11/2003 |
| EP | 1 359 363 A2 | 11/2003 |
| EP | 1 398 559 A1 | 3/2004 |
| FR | 2 227 483 | 11/1974 |
| FR | 2 394 736 | 1/1979 |
| FR | 2 689 205 | 10/1993 |
| GB | 1 520 742 | 8/1978 |
| GB | 1 555 261 | 11/1979 |
| GB | 2 167 147 A | 5/1986 |
| WO | WO 95/28593 | 10/1995 |
| WO | WO 01/61235 A1 | 8/2001 |

* cited by examiner

TUBE COUPLINGS

BACKGROUND TO THE INVENTION

1. Field of the Invention

This invention relates to tube couplings.

2. Background Prior Art

UK-A-1520742 discloses a "Speedfit" connector comprising a coupling body with a throughway open at one end and a tapered cam surface in the open end to receive a collet for locking a tube in the coupling. The collet is compressed against the tube by a slight withdrawal of the tube/collet from the coupling body which locks the tube in the coupling body. The collet can be depressed into the body to release the tube when required.

UK-A-2167147 discloses a "SuperSeal" connector which is a modification of the "Speedfit" connector and has a separate sleeve screwed into the open end of the coupling body in which the tapered cam is formed. By screwing the sleeve into the coupling body the gripping action of the collet on the tube is increased. Also the collet becomes locked up in the coupling body and cannot be depressed to release the tube. The tube is then permanently locked in the coupling body.

EP-A-0945662 discloses a tube coupling having both "Speedfit" and SuperSeal" modes of operation. More particularly the coupling comprises a coupling body having a throughway open at one end to receive an end portion of a tube and having an internal cam surface tapering towards the open end in which a collet is located for locking the tube in the coupling body by engagement with the tapered cam surface and having stop means to limit entry of the collet into the throughway. The coupling body has a main portion, the throughway of which receives the end of the tube and contains said stop means to limit insertion of the collet and an end cap in screw threaded engagement with the main body. The end cap provides said open end to the throughway and the tapered cam surface. Indexing means are provided between the end cap and the main body to define different positions of rotation of adjustment in the first of which the tube can be inserted in and by depressing the collet into the coupling body, released in the coupling body (i.e. "Speedfit" mode) and in the second of which the collet is engaged with the stop means to prevent the collet being depressed into the coupling body to release the tube (i.e. "SuperSeal" mode).

EP-A-1398559 discloses a tube coupling comprising a coupling body having a throughway open at one end to receive a tube, an end cap in screw-threaded engagement with the coupling body to move between initial and advanced positions along the coupling body and having an opening for the tube and an internal cam surface tapering towards the tube opening, a collet in the end cap engaging the cam surface to lock a tube in the cap with movement of the collet outwardly of the cap and to release the tube when depressed inwardly of the cap, and stop means in the coupling body to limit movement of the collet inwardly of the end cap, the initial position of the end cap on the coupling body allowing a tube to be inserted and locked in the end cap by the collet and to be released by depressing the collet inwardly of the cap and the advanced position of the end cap holding the collet adjacent the stop means in the coupling body to prevent release of the tube; wherein detent means are provided acting between the cap and coupling body to provide resistance to movement of the cap along the coupling body until the cap reaches said initial position on the coupling body and to allow said further movement of the cap to the advanced position.

SUMMARY OF THE INVENTION

This invention provides a tube coupling comprising a coupling body having an open ended throughway to receive a tube, an annular shoulder in the throughway facing the open end of the throughway, an 'O' ring seal for sealing with a tube located against the annular shoulder in the throughway, a collet located in the open end of the throughway for locking a tube in the throughway, the collet having a head projecting out of the open end of the throughway and resilient arms extending into the throughway, the throughway having a cam surface tapered towards the open end of the throughway and located between the annular shoulder and open end with which the ends of the arms are engagable to force the arms inwardly with movement of the collet outwardly of the throughway into gripping engagement with a tube extending through the collet into the throughway, and a ring disposed between the collet and 'O' ring seal, the side of the ring adjacent the collet having a ramp around its inner periphery to engage between the ends of the arms of the collet and the tube passing through the collet when the collet is depressed into the throughway to release the arms from the tube and thereby allow release of a tube from the coupling body.

Additionally the side of the ring adjacent the 'O' ring may also formed with a ramp around its inner periphery to engage the inner side of the 'O' ring seal and prevent the 'O' ring seal from being forced passed the shoulder in the coupling body into the throughway beyond the shoulder.

Preferably the sides of the ring including the projecting ramps are symmetrical to either side of the ring.

In any of the above arrangements the ring may be of rectangular cross-section with the ramp or ramps formed integrally on one or both sides of the ring adjacent the inner periphery of the ring, the ramp or ramps facing outwardly of the ring.

Also in any of the above arrangements the throughway may have a further annular shoulder encircling the throughway disposed beyond the first annular shoulder from the open end of the throughway with which an end of a tube inserted into the coupling body is engageable.

In one arrangement in accordance with the invention the coupling body may comprise a main body portion containing the first annular shoulder, O ring seal and ring and an end cap in screw threaded engagement with the main portion of the coupling body to enable the cap to be screwed on or off the main body portion, the cap containing said open end for the throughway, tapered cam surface and collet having resilient arms which engage with the taper cam surface in the cap.

In the latter arrangement detent means may be provided acting between the cap and main body portion of the coupling body to resist the cap being withdrawn fully from the coupling body whilst allowing the cap to be screwed onto the coupling body and screwed off the coupling body by a limited distance.

More specifically the detent means may comprise an integral annular diaphragm formed on one of the coupling body end cap engageable in slots formed in the other of the main body portion and cap, the diaphragm allowing the cap to be screwed onto and off the coupling body within the range of movement permitted by the slot.

In the latter arrangement the depth of the slot reduces to one side of the slot to increase the pressure on the flexible diaphragm as the diaphragm moves to the reduced depth side of the slot to increase resistance to the cap moving off the main body portion and vice versa.

BRIEF DESCRIPTION OF THE DRAWINGS

The following is a description of some specific embodiments of the invention, reference being made to the accompanying drawings in which.

DESCRIPTION OF THE PREFERRED EMBODIMENTS

Figure 1:
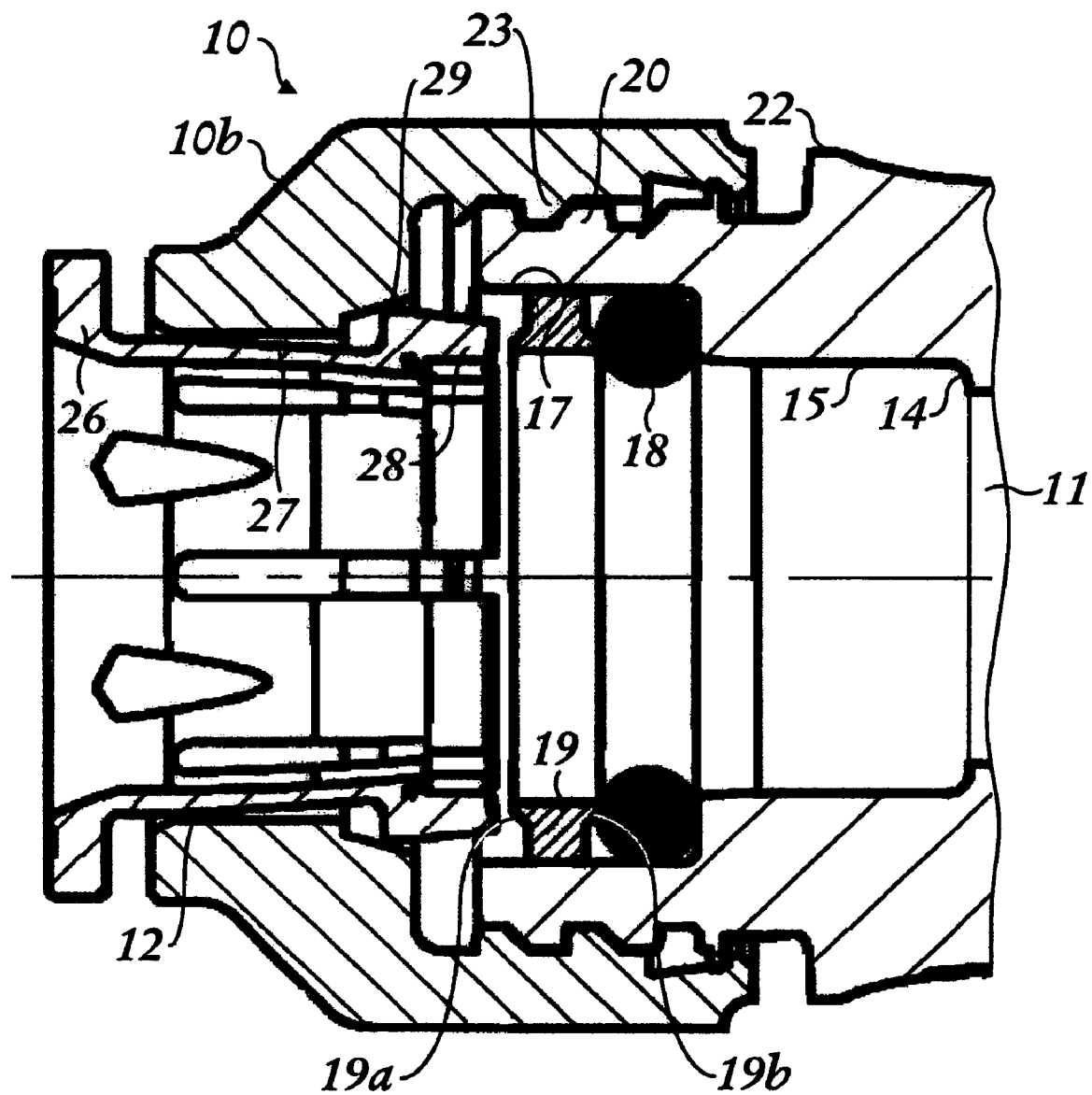
FIG. 1 is a cross-sectional view of a tube coupling in accordance with the invention including a tube inserted in the coupling.

Referring firstly to FIG. 1 of the drawings, there is shown a moulded plastics tube coupling indicated generally by reference numeral 10 having a throughway 11 open at one end 12 to receive an end portion of a tube 13. The coupling comprises a main body 10a and an end cap 10b screwed onto the main body as described below.

At a location spaced from the open end, the throughway in the main body has a first increase in diameter at a step 14 to provide an enlarged bore 15 in which the end of the tube 13 is a close sliding fit with the end of the tube engaging the step 14. The throughway has a further increase in diameter at a step 16 to form a further enlarged bore 17 in which an 'O' ring seal 18 is located against the step followed by a spacer washer or compression ring 19.

The ring 19 is of rectangular cross-section and has shallow outwardly facing ramps 19a, 19b formed around its inner periphery. The ramp adjacent the heads of the collet can engage under the heads when the collet is depressed into the coupling body to assist in releasing the grip of the collet arms with the tube passing through the collet. This is of particular significant in the case where the tube is of a relatively soft material and the teeth on the collet heads bite into the surface of the tube and do not automatically release from the surface. The ramp 19b on the ring 19 adjacent the O ring seal engages the O ring seal on its inner side and will act to prevent the seal being forced over the shoulder with which it engages into the throughway in the coupling body.

The main body 10a has an external screw-threaded section 20 extending from one end of the body followed by a reduced diameter plain section 21 in which a detent is formed as described later and followed in turn by an integral encircling radial flange 22. The flange 22 has an abutment face 23 to provide an end stop for the cap when the latter is fully screwed onto the coupling body as described below. The end cap 10b of the coupling body encircles the main body and has an internal feature for engaging with the detent on the main body portion again as described later.

A collet indicated at 25 is mounted in the open end of the coupling body comprising an annular member 26 and resilient arms 27 projecting from the annular member into the throughway of the coupling body and terminating in heads 28. The heads of the collet engage in a tapered cam surface 29 converging towards the end of the coupling body to be compressed against the tube 13 by engagement of the heads with the cam surface to lock the tube in the coupling body.

Figure 2:
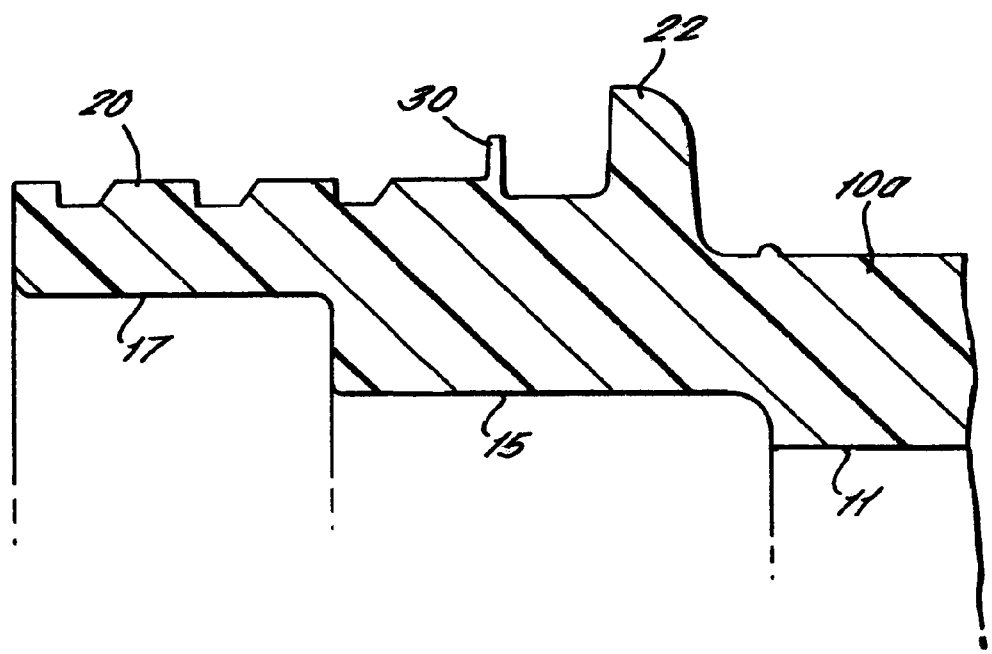
FIG. 2 is a detailed view of part of a coupling body of the tube coupling.

Reference is now made to FIG. 2 of the drawings which is a cross-sectional view through part of the main body portion 10a. Between the end of the screw threaded section 20 on the main body and the flange 22 there is an upstanding annular flexible diaphragm 30 formed integrally with the body. The diaphragm forms part of the detent arrangement referred to above for engaging with and locking the cap on the body as described later.

Figure 3:
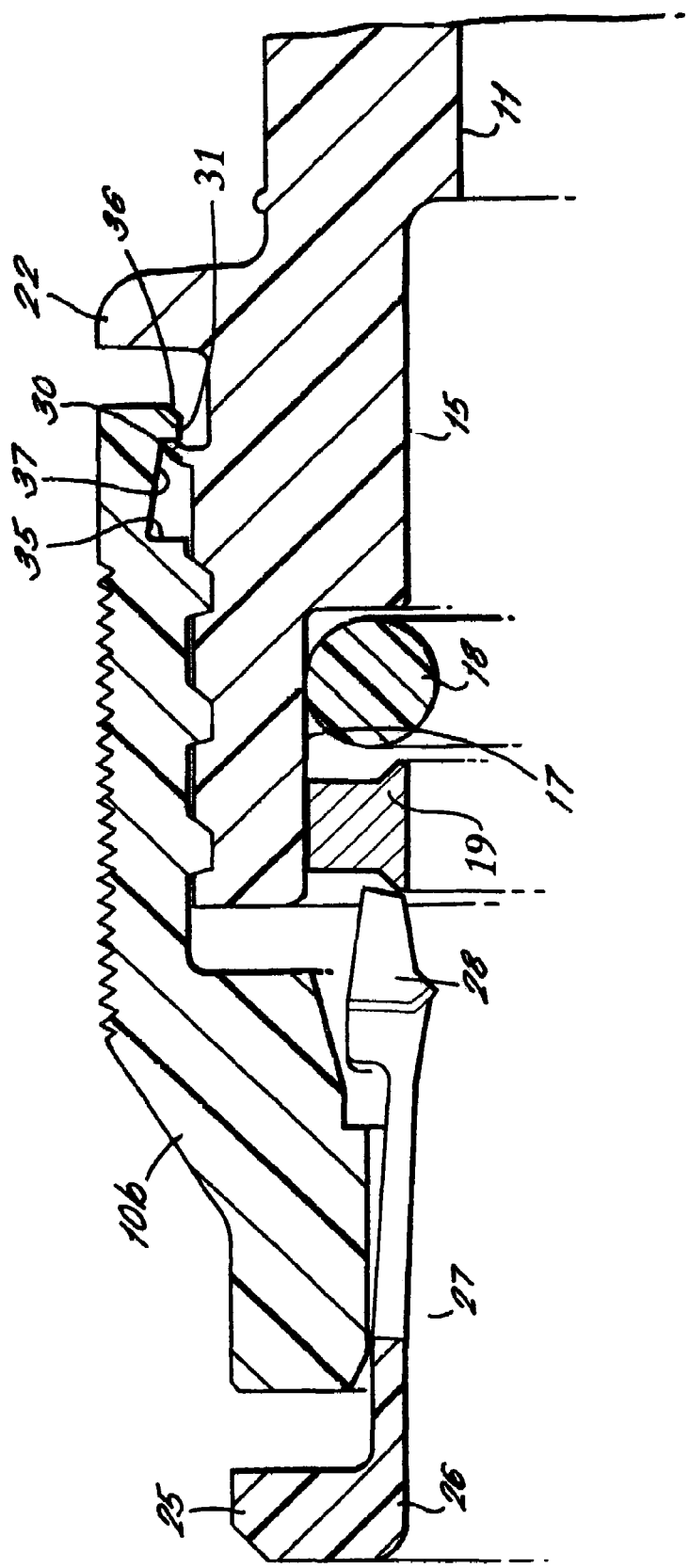
FIG. 3 is a cross-sectional view through part of the tube coupling showing a cap on the coupling body in the first "Speedfit" position.

Turning now to FIG. 3 of the drawings, the end cap 10b is shown partially screwed onto the body to an initial position in which the collet in the cap receives and holds a tube in the coupling body in the "Speedfit" manner. That is to say, the tube is locked in the coupling body but can be released by depressing the collet into the coupling body to release the gripping engagement of the collet with the tube and allow the tube to be withdrawn.

The end cap 10a has a mouth 31 with a lip around the inner periphery of the mouth. The inner side 34 of the end cap has an encircling slot 35 adjacent the mouth, in which the annular diaphragm 30 is snap engageable. The mouth of the cap has a bevelled entry indicated at 36 to assist in deforming the diaphragm inwardly as the cap is screwed onto the body and the diaphragm is forced through the mouth of the cap. The diameter of the lip at the mouth of the cap at the entry is less than the diameter of the diaphragm but is slightly greater than the rest of the inner diameter of the cap to facilitate entry of the diaphragm into the slot.

Screwing the cap onto the body causes the diaphragm to snap into the slot 35 at the end nearest the mouth 31 of the cap. The cap is then located in the first "Speedfit" position referred to above. The bottom wall 37 of the slot is tapered to reduce in diameter towards the open end of the cap so that the diaphragm is held bent over towards the side of the slot adjacent the mouth of the slot. Thus, the diaphragm is trapped in the corner formed between the bottom wall of the slot and the side wall of the slot when the cap is rotated in a direction to withdraw from the main body to prevent withdrawal of the cap from the main body portion beyond the first position.

Figure 4:
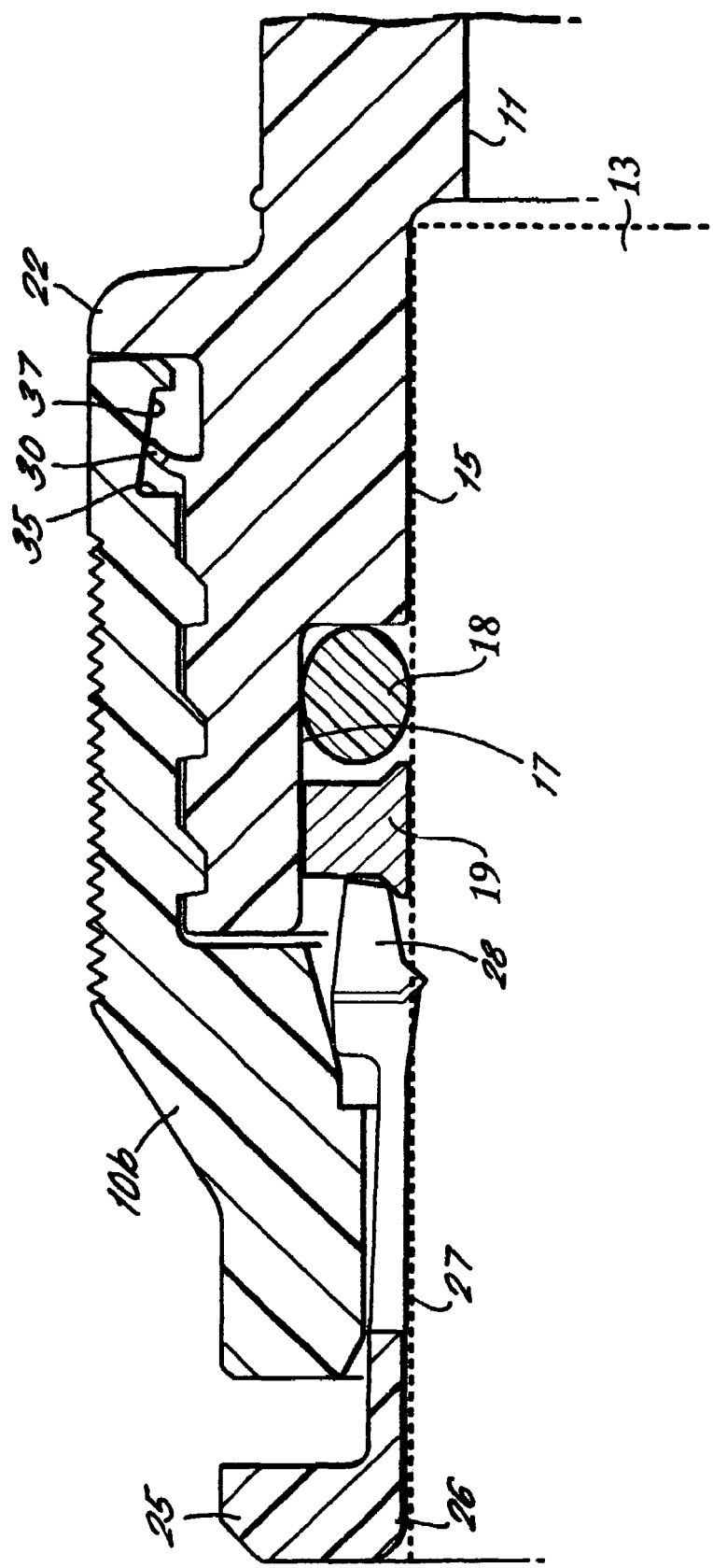
FIG. 4 is a cross-sectional view through part of the coupling body showing the cap in the second "SuperSeal" position.

As the cap is screwed further onto the body, the diaphragm rides up the tapering undercut of the bottom wall of the slot in the cap relaxing the diaphragm slightly, and therefore reducing the resistance to rotation of the cap. The cap can then be screwed onto the body until it engages the upstanding end flange 22 of the coupling body as indicated in FIG. 4 in which the cap is in the second or "SuperSeal" position. The collet is then held in engagement with the end stop in the coupling body and cannot be depressed to allow a tube to be released from the coupling body.

The arrangement thus provides a tube coupling body which is readily assembled and which provides both "Speedfit" and "SuperSeal" functions without unduly stressing the components of the body.

A number of further embodiments in the invention are also envisaged as follows:

This design can also be used on metal coupling bodies or rigid plastic coupling bodies in which case the flexible diaphragm could be moulded on a separate split ring which is assembled into a groove or recess on the body between the thread and the large flange so that the detent engages in the slot on the cap.

Equally the separate split ring could be mounted in the cap with the flexible diaphragm projecting radially inwardly to engage in a slot in the main body portion. The slot in the body portion would be located between the thread and the large flange. Again, the slot in the body could be tapered in diameter.

In all of the designs above the diaphragm could be interrupted once or several times to allow for tooling or to allow the diaphragm's resilient/flexible characteristics to be optimised.

Figure 5:
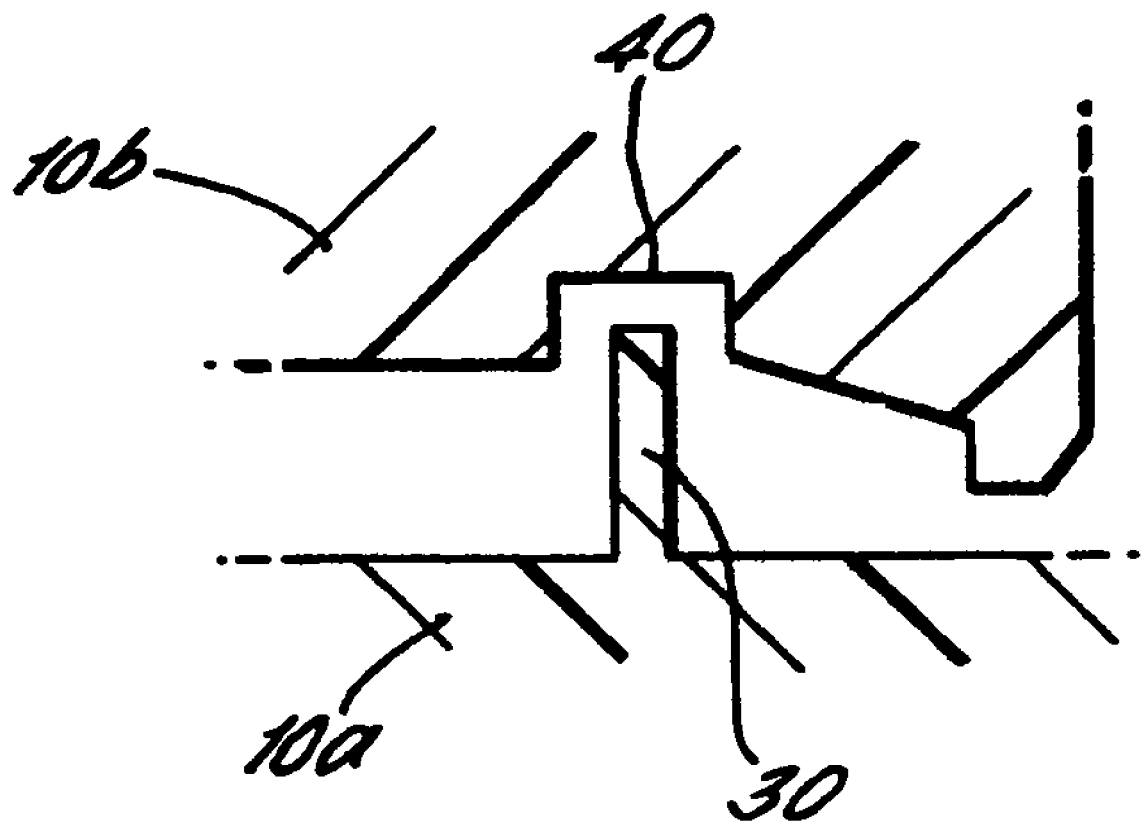
FIG. 5 shows a modified form of the end cap of the coupling body.

In accordance with the further modification, an enlarged groove 30 is formed at the end of the slot remote from the open end of the cap as illustrated in FIG. 5. When the cap is rotated provisionally to move the diaphragm into this position, the cap is in a non-load imposing position and thereby allows easy threading.

The invention claimed is:

1. A tube coupling comprising
   a coupling body having an open ended throughway to receive a tube,
   an annular shoulder in the throughway facing the open end of the throughway,
   an 'O' ring seal for sealing with a tube located against the annular shoulder in the throughway,
   a collet located in the open end of the throughway for locking a tube in the throughway, the collet having
      an annular member projecting out of the open end of the throughway and
      resilient arms extending from the annular member into the throughway, the throughway having
      a cam surface adjacent said open end which is tapered towards the open end of the throughway with which the ends of the arms are engageable to force the arms inwardly with movement of the collet outwardly of the throughway into gripping engagement with a tube extending through the collet into the throughway, and
      a ring disposed in the throughway between the collet and 'O' ring seal,
         one side of the ring adjacent the collet having a ramp around its inner periphery to engage the ends of the collet arms when the collet is depressed into the throughway to release the arms from the tube and thereby allow release of a tube from the coupling body and
         the other side of the ring having a ramp around its inner periphery to engage and push radially outward against the O ring seal to hold the seal in alignment in the throughway when the collet is depressed into the throughway.

2. A tube coupling as claimed in claim 1, wherein the ramp on the side of the ring adjacent the collet is formed to engage between the collet arms and tube passing through the collet to lift the collet arms from the tube when the collet is depressed into the throughway.

3. A tube coupling as claimed in claim 1, wherein the ramp on the side of the ring adjacent the O ring is formed to engage between the O ring and tube to align the O ring in the throughway to prevent the O ring being forced past the shoulder in the coupling body.

4. A tube coupling as claimed in claim 1, wherein the sides of the ring including the projecting ramps are symmetrical to either side of the ring.

5. A tube coupling as claimed in claim 1, wherein the ring is of rectangular cross-section with the ramp or ramps formed integrally on one or both sides of the ring adjacent the inner periphery of the ring, the ramp or ramps facing outwardly of the ring.

6. A tube coupling as claimed in claim 1, wherein the throughway has a further annular shoulder encircling the throughway disposed beyond the first annular shoulder from the open end of the throughway with which an end of a tube inserted into the coupling body is engageable.

7. A tube coupling as claimed in claim 1, wherein the coupling body comprises
   a main body portion containing the first annular shoulder, O ring seal and the ring and
   an end cap in screw threaded engagement with the main portion of the coupling body to enable the cap to be screwed on or off the main body portion, the cap containing the open end for the throughway, the tapered cam surface and the collet having resilient arms which engage with the tapered cam surface in the cap.

8. A tube coupling as claimed in claim 7, wherein detent means are provided acting between the cap and main body portion of the coupling body to resist the cap being withdrawn fully from the coupling body whilst allowing the cap to be screwed onto the coupling body and screwed off the coupling body by a limited distance.

9. A tube coupling as claimed in claim 8, wherein the detent means comprise an integral annular diaphragm formed on one of the coupling body and the cap engageable in a slot formed in the other of the main body portion and the cap, the diaphragm allowing the cap to be screwed onto and off the coupling body within the range of movement permitted by the slot.

10. A tube coupling as claimed in claim 9, wherein the slot has a bottom face which is inclined to one side of the slot engaged with the flexible diaphragm and provides an increasing resistance to screwing the cap onto the coupling body.

11. A tube coupling comprising
   a coupling body having an open ended throughway to receive a tube,
   an annular shoulder in the throughway facing the open end of the throughway,
   an 'O' ring seal for sealing with a tube located against the annular shoulder in the throughway,
   a collet located in the open end of the throughway for locking a tube in the throughway, the collet having
      an annular member projecting out of the open end of the throughway and
      resilient arms extending from the annular member into the throughway, the throughway having
      a cam surface adjacent said open end which is tapered towards the open end of the throughway with which the ends of the arms are engageable to force the arms inwardly with movement of the collet outwardly of the throughway into gripping engagement with a tube extending through the collet into the throughway, and
      a ring disposed in the throughway between the collet and 'O' ring seal,
         one side of the ring adjacent the collet having a ramp around its inner periphery to engage the ends of the collet arms when the collet is depressed into the throughway to release the arms from the tube and thereby allow release of a tube from the coupling body and
         the other side of the ring having a ramp around its inner periphery to engage between the 'O' ring seal and tube to hold the seal in alignment in the throughway when the collet is depressed into the throughway to prevent the 'O' ring being forced past the shoulder in the coupling body.

12. A tube coupling comprising:
   a coupling body having a throughway with an open end, the throughway extending along a longitudinal axis;
   an annular shoulder disposed in the throughway so as to face the open end of the throughway;
   an 'O' ring seal disposed against the annular shoulder in the throughway;

a collet inserted into the open end of the throughway, the collet comprising:
   an annular member projecting out of the open end of the throughway; and
   resilient arms extending from the annular member into the throughway;
a cam surface adjacent the open end of the throughway so as to receive the ends of the resilient arms, the cam surface being tapered towards the open end of the throughway so as to force the arms toward the longitudinal axis with movement of the collet outwardly of the throughway; and
a ring disposed in the throughway between the collet and the 'O' ring seal, the ring having a first side adjacent the collet and an opposite second side adjacent the 'O' ring seal,
the first side having a ramp around its inner periphery that engages the ends of the collet arms when the collet is depressed into the throughway so as to exert pressure on the collet arms in a direction away from the longitudinal axis; and
the second side having a ramp around its inner periphery that engages the 'O' ring seal when the collet is depressed into the throughway so as to exert pressure on the 'O' ring seal in a direction away from the longitudinal axis.

* * * * *

UNITED STATES PATENT AND TRADEMARK OFFICE
CERTIFICATE OF CORRECTION

PATENT NO. : 7,425,022 B2  Page 1 of 1
APPLICATION NO. : 11/346113
DATED : September 16, 2008
INVENTOR(S) : John Derek Guest It is certified that error appears in the above-identified patent and that said Letters Patent is hereby corrected as shown below:

Column 1
Line 27, change "andSuperSeal'" to --and "SuperSeal"--

Column 2
Line 44, change "O ring" to --'O' ring--

Column 3
Line 16, change "position, and" to --position; and--
Line 43, change "significant" to --significance--
Line 46, change "O ring" to --'O' ring--
Line 47, change "O ring" to --'O' ring--

Signed and Sealed this

Thirtieth Day of December, 2008

JON W. DUDAS
*Director of the United States Patent and Trademark Office*